US006629915B1

(12) United States Patent
Ohki et al.

(10) Patent No.: US 6,629,915 B1
(45) Date of Patent: Oct. 7, 2003

(54) SEMI-CONDUCTING ROLL AND DEVELOPING DEVICE

(75) Inventors: Tsuneo Ohki, Saitama (JP); Yasumoto Kodama, Saitama (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 10 days.

(21) Appl. No.: 09/703,970

(22) Filed: Nov. 1, 2000

(30) Foreign Application Priority Data

Nov. 4, 1999 (JP) .......................................... 11-314209

(51) Int. Cl.[7] ................................................ F16C 13/00
(52) U.S. Cl. ........................................... 492/54; 492/53
(58) Field of Search ............................. 492/54, 49, 53, 492/56; 399/302, 308, 388; 29/895.3, 895.32

(56) References Cited

U.S. PATENT DOCUMENTS 4,981,381 A * 1/1991 Murata ........................ 492/56
5,742,880 A * 4/1998 Takenaka et al. ........... 399/176
5,753,154 A * 5/1998 Hayashi et al. ............ 264/45.9
5,802,440 A * 9/1998 Maeyama ................... 399/327
5,862,447 A * 1/1999 Matsumura ................. 399/388
6,044,243 A * 3/2000 Hara .......................... 399/302
6,144,830 A * 11/2000 Kusaba et al. .............. 399/302
RE37,429 E * 10/2001 Nojima et al. .............. 428/335

* cited by examiner

*Primary Examiner*—Gregory Vidovich
*Assistant Examiner*—Marc Jimenez
(74) *Attorney, Agent, or Firm*—Darby & Darby

(57) ABSTRACT

A semi-conducting roll has one layer of an elastic semi-conducting material layer on the outer side of a conductive shaft. A coating material layer containing a resin component having a SP-value of 6 to 12.5 is substantially uniformly formed on the outer peripheral surface of the semi-conducting material layer so as to control the amount of the toner adhering to the coating material layer within the range of 0.5 to 1.5 mg/cm$^2$. This semi-conducting roll is used as a charging roll, developing roll, transfer roll and/or cleaning roll of a developing device for an electrophotographic printer and the like.

6 Claims, 1 Drawing Sheet

SEMI-CONDUCTING ROLL AND DEVELOPING DEVICE

BACKGROUND OF THE INVENTION (1) Field of the Invention

The present invention relates to a preferred semi-conducting roll such as for a charging roll, developing roll, transfer roll, etc., and also relates to a developing device in a printer, copier, facsimile machine and the like, including the rolls.

(2) Description of the Prior Art

Though not illustrated, a developing device based on electrophotography has a conductive shaft element with a supporting element layer made up of an elastic semi-conducting material layer coated on the outer peripheral side thereof and has the function of supporting a thin layer of tribo-electrified toner on this supporting element layer and developing a static latent image formed on the static latent image bearer, with this triboelectrified toner. The developing roll of this developing device employs a semi-conducting roll, which is required to have various properties such as electric conductivity, environmental resistance, low hardness, triboelectric performance, toner conveyance performance and the like.

To meet these requirements, recently studies and investigation have been made into obtaining semi-conducting rolls by using urethane rubber, NBR, silicone rubber or the like as a basic material and adding an electric conductionizer, e.g., electronic conductive material or ionic conductive material, to the basic material. In addition to meeting the requirements of the above properties and mechanical properties, this roll should meet the requirements of the initial and time-dependent printing characteristics (including print density dependent on the toner conveyance performance, fogs and reproducibility of fine lines dependent on the toner charge characteristics).

When urethane rubber is used to produce a semi-conducting roll, it is difficult to provide sufficient charge on the toner, due to its electrification characteristics. Therefore, fogs are liable to occur and the toner is easily degraded because a large amount of frictional energy acts on the toner. Further, toner conveyance is so poor that there are quite a few possibilities of causing an insufficiency in printing density. When a conventional method of producing semi-conducting rolls is used, there is the risk that the powder characteristics of the toner may be degraded and hence degrade the time-dependent printing performance.

SUMMARY OF THE INVENTION

The present invention has been devised in view of the above problems and it is therefore an object of the present invention to provide a semi-conducting roll and a developing device using the rolls, which is able to improve its resistance to abrasion, reduce density unevenness and occurrence of fogs and realize stable image forming in the long term use, without degrading the time-dependent printing performance.

In order to achieve the above object, the present invention is configured as follows:

In accordance with the first aspect of the present invention, a semi-conducting roll, at least, has one layer of an elastic semi-conducting material layer on the outer side of a conductive shaft, and is characterized in that a coating material layer containing a resin component having a SP-value of 6 to 12.5 is substantially uniformly formed on the outer peripheral surface of the semi-conducting material layer so as to control the amount of the toner adhering to the roll within the range of 0.5 to 1.5 mg/cm$^2$.

In accordance with the second aspect of the present invention, the semi-conducting roll having the above first feature is characterized in that the coating material layer contains an electronic conductive material or ionic conductive material.

In accordance with the third aspect of the present invention, a developing device including a semi-conducting roll, at least, has one layer of an elastic semi-conducting material layer on the outer side of a conductive shaft, and is characterized in that a coating material layer containing a resin component having a SP-value of 6 to 12.5 is substantially uniformly formed on the outer peripheral surface of the semi-conducting material layer so as to control the amount of the toner adhering to the roll within the range of 0.5 to 1.5 mg/cm$^2$.

In accordance with the fourth aspect of the present invention, the developing device having the above third feature is characterized in that the coating material layer of the semi-conducting roll contains an electronic conductive material or ionic conductive material.

According to the present invention, since the affinity between the toner and the coating material layer which supports and conveys the toner is adjusted, it is possible to control the conveyance performance of the toner and the abrasion characteristics of the roll. Specifically, the resin contained in the coating material layer is specified so as to have an SP-value of 6 to 12.5, to thereby improve the toner conveyance and durability and control the affinity between the coating material layer and the toner. Therefore, it is possible to control toner filming. It is also possible to control electrification performance by the functional groups contained in the resin. Since the toner conveyance can be controlled by the density of the surface roughness, it is possible to maintain high-quality print images free from print failures, over a long period of time.

DESCRIPTION OF THE PREFERRED EMBODIMENT

Figure 1A:
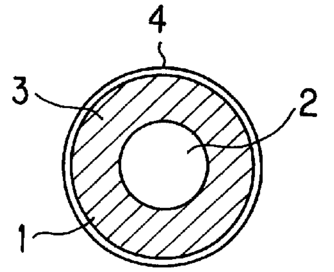
FIGS. 1A and 1B are illustrative views showing the embodiment of a semi-conducting roll of the present invention, FIG. 1A being an illustrative sectional view showing a semi-conducting roll having a solid semi-conducting material layer, FIG. 1B being an illustrative sectional view showing a semi-conducting roll having a spongy semi-conducting material layer.
Figure 1B:
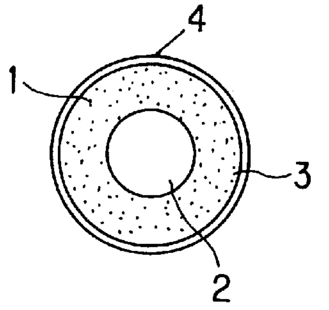
Figure 2:
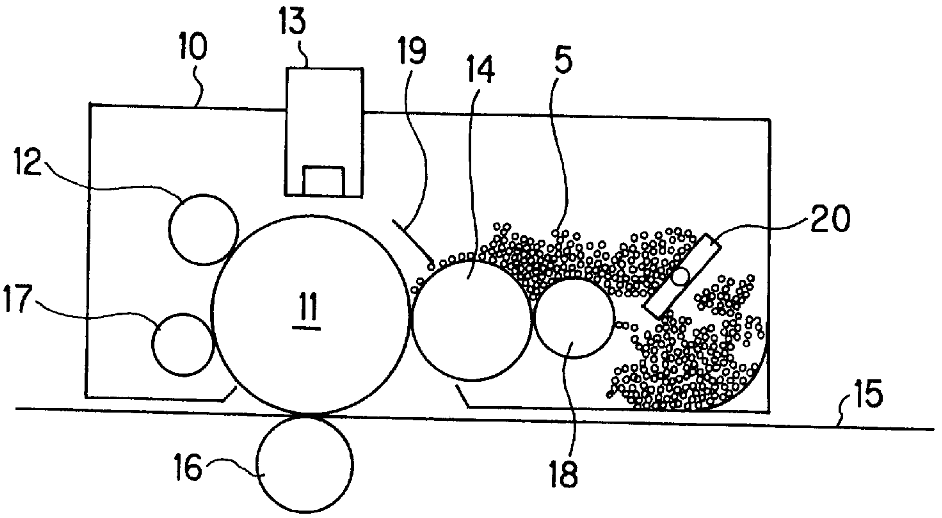
FIG. 2 is an illustrative sectional view showing a developing device having the semi-conducting rolls of the embodiment of the present invention.

The preferred embodiment of the present invention will hereinafter be described in detail with reference to the accompanying drawings. The semi-conducting roll in this embodiment, as shown in FIGS. 1A and 1B, has a semi-conducting material layer 3 constituting a supporting element layer 1 and a coating material layer 4 having a SP-value of 6 to 12.5, uniformly deposited on the outer peripheral surface of semi-conducting material layer 3, so that the amount of adherence of toner 5 adhering on coating material layer 4 will fall within the range of 0.5 to 1.5 mg/cm$^2$. As shown in FIG. 2, this roll can be used for a rotatable charging roll 12, developing roll 14, transfer roll 16 and/or cleaning roll 17 etc., in a developing device 10 for an electrophotographic printer or the like.

As shown in FIGS. 1A and 1B, supporting element layer 1 is configured of a conductive, supporting shaft element 2 and an elastic semi-conducting material layer 3 formed integrally so as to cover the outer peripheral side of shaft element 2 and has a specific volume resistivity of $10^1$ to $10^9$ Ω·cm. Conductive shaft element 2 is of a cylinder-shape having a circular section made up of core metal such as iron, aluminum, SUS, brass or the like. Alternatively, the conductive shaft element may be a core element made up of thermoplastic resin or thermosetting resin and treated by metal plating or may be molded from thermoplastic resin or thermosetting resin with carbon black, metallic powder or the like as an electric conductionizer blended therein. Shaft element 2 thus configured may be grounded at one end or may be applied with a bias voltage so as to have the functions of charging the static latent image bearer, injecting charges to toner 5, attracting toner 5, conveying toner 5 to the static latent image bearer so as to develop the static latent image, charging and performing transfer.

Semi-conducting material layer 3 is prepared by blending at least one of the so-called rubbers or elastomers such as silicone rubber, ethylene-propylene-dien rubber, polyurethane, chloroprene rubber, natural rubber, butyl rubber, polyisoprene rubber, polybutadien rubber, styrene-butadiene rubber, nitrile rubber, ethylene-propylene rubber, acrylic rubber, and combinations of these, a filler such as aerosol silica, sedimentating silica, reinforcing carbon black, or the like, and a conductive filler such as conductive carbon black, nickel, aluminum, copper or any other metal powder, metal oxide such as zinc oxide and tin oxide, or particles made up of core material, such as barium sulfate, titanium oxide, potassium titanate, coated by tin-oxide, and kneading the mixture with a vulcanizing agent such as hydrogen siloxane, isocyanate etc., under the presence of a peroxide and a platinum catalyst.

Semi-conducting material layer 3 is solid in FIG. 1A and spongy in FIG. 1B.

When semi-conducting material layer 3 is formed, shaft element 2 and the above rubber or elastomer may be integrally formed and extruded by means of a crosshead extruder and primarily vulcanized through a gear oven or IR furnace. Alternatively, shaft element 2 and the silicone rubber compound may be heated at the same time in a die and compression formed. It is also possible to stabilize the physical properties by effecting secondary vulcanization for a certain time after the forming using a gear oven, etc. Semi-conducting material layer 3 integrated with shaft element 2 is processed through a cylindrical grinding machine, shot blaster, sand blaster, lapping device or by buffing, as required so as to create predetermined surface conditions (preferably, $R_z$=3 to 15 μm and $S_m$=3 to 30 μm). The thus configured semi-conducting material layer 3 functions as the electrode for the developing step and as the electrode for contact charging and charge injection into toner 5 and also creates a uniform developing electric field between itself and photoreceptor owing to its rubber elasticity.

The specific volume resistance of supporting element layer 1 is specified to fall within the range of $10^1$ to $10^9$ Ω·cm. This limitation is determined because if the resistivity departs from this range, various deficiencies such as fogs, degradation of the transfer efficiency, unsuitable print density, and OPC dielectric breakdown etc., may occur.

The material of coating material layer 4 is not particularly limited but is preferably formed of a resin or elastomer having amino groups or hydroxyl groups. Examples include alkyd resin, phenol-denatured or silicone-denatured alkyd resin, oil-free alkyd resin, acrylic resin, silicone resin, epoxy resin, fluororesin, phenol resin, polyamide resin, urethane resin and combinations of these. For cross-linking, cross-linking agents such as an isocyanate compound, melamine compound, epoxy compound, peroxide, phenol compound, hydrogen siloxane compound, etc., can be used.

Coating material layer 4 may be formed by uniformly applying the coating material containing the above resin or elastomer only, or may be formed by adding a conductive powder or an ion conductive material to the above resin or elastomer so that the coating material layer becomes semi-conducting. Coating material layer 4 supports and conveys toner 5 on the surface thereof with the functions of the surface roughness, van der Waals force, mirror force and/or Coulomb force and other functions.

Developing device 10, as shown in FIG. 2, has a photoreceptor drum 11, further including, around this photoreceptor drum 11, a charging roll 12 for charging the drum at a fixed potential, an LED array 13 as an exposure device for forming a latent image, a developing roll 14 for visualizing the latent image with toner 5, a transfer roll 16 for transferring the toner image on the photoreceptor to recording paper 15, a cleaning-roll 17 and the like. Using these elements, the developing device functions to record the image on recording paper 15. In the figure, 18 designates a toner conveyance roll, 19 a tribo-charging blade and 20 a toner agitator.

According to the above configuration, the outer peripheral surface of semi-conducting material layer 3 is formed by uniformly coating material layer 4 containing the resin component having a SP value of 6 to 12.5 so as to limit the amount of adherence of toner 5 onto coating material layer 4 to the range of 0.5 to 1.5 mg/cm$^2$. Therefore, this semi-conducting roll is used as charging roll 12, developing roll 14 and/or transfer roll 16, it is possible to provide beneficial printing characteristics both in the starting stage and after aging. Further, it is possible to reduce and prevent density unevenness in black solid areas. Accordingly, it is possible to obtain markedly excellent printed images.

Examples of semi-conducting rolls according to the present invention and comparative examples, as well as test results of these will be described hereinbelow.

EXAMPLES

Fabrication of the Shaft Element

A shaft element 2 was produced by applying a silicone primer, Primer No.16(a trade name of a product of Shin-Etsu Chemical Co., Ltd.) on a shaft having 10 mm in diameter and 250 mm long, made up of SUM22 surface treated by electroless nicked plating, and baking it in a gear oven at 150° C. for 10 min.

Fabrication of the Semi-conducting Roll

First, 100 parts by weight of methyl vinyl silicone crude rubber, KE-78VBS(a trade name of a product of Shin-Etsu Chemical Co., Ltd.), 10 parts by weight of dimethyl silicone crude rubber, KE-76VBS(a trade name of a product of Shin-Etsu Chemical Co., Ltd.), 10 parts by weight of carbon black, ASAHI THERMAL(a trade name of a product of ASAHI CARBON CO., LTD.), 15 parts by weight of an aerosol silica filler, AEROSIL200 (a trade name of a product of NIPPON AEROSIL CO. LTD.), 0.5 part of a platinum catalyst, C-19A(a trade name of a product of Shin-Etsu Chemical Co., Ltd.), 2.4 parts of hydrogen siloxane, C-19B(a trade name of a product of Shin-Etsu Chemical Co., Ltd.), were loaded and kneaded by a pressure kneader to prepare a silicone composition.

Then, the silicone composition was integrated with shaft element 2 using a cross-head extruder and was heated and vulcanized at 300° C. for 15 min., in a gear oven to vulcanize and bond the composition to shaft element 2, thus forming on shaft element 2 having a diameter of 20 mm, which subsequently was secondarily vulcanized at 200° C. for four hours. The outcome was ground by a cylindrical grinding machine to form supporting element layer 1 having a hardness of 50° (corresponding to ASKER C), a diameter of 16 mm and a length, in the rubber area, of 210 mm. A composition prepared by compounding 100 parts by weight of a silicone paint, Silprint(a trade name of a product of Shin-Etsu Chemical Co., Ltd.) and 5 parts by weight of CLA-L(a trade name of a product of Shin-Etsu Chemical Co., Ltd.) as a cross-linking agent and diluting with 5 parts by weight of toluene, were spray coated on the thus obtained supporting element layer 1 to form a coating material layer 4. Thus, the semi-conducting roll was produced.

Subsequently, in the same manner, the SP-value of the resin component for coating material layer 4 was varied within the range of 6 to 12.5, to produce semi-conducting rolls of examples 2 to 4, as samples.

Test

Each of the semi-conducting rolls of examples 1 to 4 was set as developing roll 14 of a commercialized, electrophotographic printer.using a negatively charged toner, and printing test was effected. From the test result, for all examples 1 to 4, high-quality printed images were obtained after printing of 6000 sheets without any degradation as to the printing characteristics found. At the same time., as the surface of each semi-conducting roll was observed with a microscope, no anomalies such as filming of toner 5, deterioration of the roll material and the like were found at all.

Then, each of the semi-conducting rolls of examples 1 to 4 was set as transfer roll 16 and charging roll 12, and printing test was effected. From the test result, excellent printed images were obtained.

COMPARATIVE EXAMPLES

Semi-conducting rolls shown in comparative examples 1 and 2 in Table 1 below were produced and the same printing test as the above examples was effected. Each of the semi-conducting rolls were formed in the same manner as example 1, except in that the SP-value of the resin component of coating material layer 4 was out of the range of 6 to 12.5.

The test results of the above examples 1, 2, 3 and 4 and comparative examples 1 and 2 are summarized in Table 1.

TABLE 1

| | Comp. Ex. 1 | Comp. Ex. 2 | Example 1 | Example 2 | Example 3 | Example 4 |
|---|---|---|---|---|---|---|
| Name of resin contained in coating layer | Urethane | Phenol resol resin | Silicone | Polyester | Acrylic rubber | Melamine |
| SP-value | 4.9 | 13.1 | 7.5 | 12.5 | 9.0 | 11.7 |
| Toner adherence | 0.72 | 0.45 | 0.87 | 0.95 | 0.73 | 0.91 |
| Roll resistance | 51 | 40 | 37 | 34 | 40 | 47 |
| Initial print density (Macbeth density) | 1.46 | 1.28 | 1.44 | 1.48 | 1.41 | 1.42 |
| Initial fogs (Macbeth density) | 0.024 | 0.028 | 0.008 | 0.014 | 0.010 | 0.009 |
| Print density after aging run (Macbeth density) | 1.13 | 1.02 | 1.41 | 1.36 | 1.33 | 1.38 |
| Fogs after aging run (Macbeth density) | 0.024 | 0.053 | 0.013 | 0.012 | 0.014 | 0.010 |
| Unevenness in black solid area after aging run | observed | observed | unobserved | unobserved | unobserved | unobserved |
| Toner sticking | observed | observed | unobserved | unobserved | unobserved | unobserved |
| Production acceptance (○: acceptable X: unacceptable) | X | X | ○ | ○ | ○ | ○ |

Here, the testing method and acceptance evaluation are as follows:

(1) Testing Method

1) SP-value

The SP-value was calculated based on the chemical composition of each resin using the Fedors method.

2) Toner Adherence

With developing roll 14 set on a commercialized printer, the operation of the printer was stopped by shutting down the power while a 5% duty image was being printed, so as to check the untransferred toner layer on photoreceptor drum 11. That is, the untransferred toner layer was sampled or separated from the drum by means of a transparent adhesive tape so that the amount of adherence of the toner per unit area could be measured using an electronic balance.

3) Roll Resistance

With the semi-conducting roll placed on a gold-plated electrode having a length 5 mm longer the full length of the rubber part, a pair of 500 gram weights were hanged at both ends of this semi-conducting roll. In this arrangement, a voltage of 10 V was applied so that the resistance between the shaft element 2 and coating material layer 4 on the surface of the semi-conducting roll was measured.

4) Print Density

With the semi-conducting roll set on an electrophotographic printer, black solid, halftone, 5% duty and white images were repeatedly formed. The black solid images at the initial stage and after an aging run were measured as to the Macbeth density by a Macbeth densitometer.

5) Fogs

With the semi-conducting roll set on an electrophotographic printer, black solid, halftone, 5% duty and white images were repeatedly formed. The white areas of 5% duty images at the initial stage and after an aging run were measured as to the Macbeth density by a Macbeth densitometer.

6) Unevenness in Black Solid Areas

With the semi-conducting roll set on an electrophotographic printer, black solid, halftone, 5% duty and white images were repeatedly formed. The black solid areas were visually observed to determine the presence of printing unevenness in black solid areas.

(2) Acceptability Criteria

1) Print Density

For both the initial stage and the stage after aging, values lower than 1.3 were determined to be unacceptable.

2) Fogs

For both the initial stage and the stage after aging, values exceeding 0.015 were determined to be unacceptable.

3) Unevenness in Black Solid Areas

For both the initial stage and the stage after aging, the sample with unevenness observed in black solid areas was determined to be unacceptable.

4) Toner Filming

The semi-conducting roll surface after the aging run was checked by a microscopic observation. The sample with filming observed was determined to be unacceptable.

As has been described heretofore, according to the present invention, a coating material layer containing a resin component having a SP-value of 6 to 12.5 is substantially uniformly formed on the outer peripheral surface of a semi-conducting material layer so as to control the amount of the toner adhering to this coating material layer within the range of 0.5 to 1.5 mg/cm$^2$. This configuration is effective in improving the roll's resistance against abrasion, reducing density unevenness and fogs. It is also possible to stabilize the images after a long term use of the roll. Further, it is possible to prevent degradation of the time-dependent printing characteristics.

What is claimed is:

1. A semi-conducting roll comprising an elastic semi-conducting material layer on the outer side of a conductive shaft, and a coating material layer containing a resin component having a SP-value of 6 to 12.5 is substantially uniformly formed on the outer peripheral surface of the semi-conducting material layer so as to control the amount of the toner adhering to the roll within the range of 0.5 to 1.5 mg/cm$^2$, the coating material layer being formed of a material that is crosslinked by a crosslinking agent selected from the group consisting of the following compounds: melamine, epoxy, peroxide, phenol, and hydrogen siloxide, the resin being one or a combination of resins chosen from the group consisting of the following resins: alkyd, phenol-denatured alkyd, silicone-denatured alkyd, oil-free alkyd, acrylic, epoxy, phenol and polyamide and wherein the elastic semi-conducting material layer and the conductive shaft comprise an integral single extruded member.

2. The semi-conducting roll according to claim 1, wherein the coating material layer contains an electronic conductive material or ionic conductive material.

3. A developing device including a semi-conducting roll comprising an elastic semi-conducting material layer on the outer side of a conductive shaft, and a coating material layer containing a resin component having a SP-value of 6 to 12.5 is substantially uniformly formed on the outer peripheral surface of the semi-conducting material layer so as to control the amount of the toner adhering to the roll within the range of 0.5 to 1.5 mg/cm$^2$, the coating material layer being formed of a material that is crosslinked by a crosslinking agent selected from the group consisting of the following compounds: melamine, epoxy, peroxide, phenol, and hydrogen siloxide, the resin being one or a combination of resins chosen from the group consisting of the following resins: alkyd, phenol-denatured alkyd, silicone-denatured alkyd, oil-free alkyd, acrylic, epoxy, phenol and polyamide and wherein the elastic semi-conducting material layer and the conductive shaft comprise an integral single extruded member.

4. The developing device according to claim 3, wherein the coating material layer of the semi-conducting roll contains an electronic conductive material or ionic conductive material.

5. The semi-conducting roll according to claim 1, wherein the integral single extruded member comprising the semi-conductor material layer and the conductive shaft is shaped and dimensioned by a crosshead extruder.

6. The developing device according to claim 3, wherein the integral single extruded member comprising the semi-conductor material layer and the conductive shaft is shaped and dimensioned by a crosshead extruder.

* * * * *